(12) United States Patent
Machida et al.

(10) Patent No.: US 10,308,801 B2
(45) Date of Patent: Jun. 4, 2019

(54) HEAT RAY-SHIELDING PARTICLE-CONTAINING COMPOSITION AND METHOD OF PRODUCING THE SAME, HEAT RAY-SHIELDING FILM, AND HEAT RAY-SHIELDING LAMINATED TRANSPARENT BASE MATERIAL

(71) Applicant: SUMITOMO METAL MINING CO., LTD., Tokyo (JP)

(72) Inventors: Keisuke Machida, Isa (JP); Kenichi Fujita, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 518 days.

(21) Appl. No.: 14/894,925

(22) PCT Filed: May 26, 2014

(86) PCT No.: PCT/JP2014/063792
§ 371 (c)(1),
(2) Date: Nov. 30, 2015

(87) PCT Pub. No.: WO2014/192676
PCT Pub. Date: Dec. 4, 2014

(65) Prior Publication Data
US 2016/0122524 A1 May 5, 2016

(30) Foreign Application Priority Data

May 28, 2013 (JP) ................. 2013-111863

(51) Int. Cl.
| | |
|---|---|
| C08J 5/18 | (2006.01) |
| C08K 3/22 | (2006.01) |
| B32B 27/30 | (2006.01) |
| C01G 41/00 | (2006.01) |
| C03C 17/00 | (2006.01) |
| C08L 29/14 | (2006.01) |
| C08L 33/00 | (2006.01) |
| C08L 33/06 | (2006.01) |
| C08L 33/14 | (2006.01) |
| C08L 33/16 | (2006.01) |

(52) U.S. Cl.
CPC ............ *C08L 33/00* (2013.01); *B32B 27/308* (2013.01); *C01G 41/00* (2013.01); *C03C 17/009* (2013.01); *C08J 5/18* (2013.01); *C08K 3/22* (2013.01); *C08L 29/14* (2013.01); *C08L 33/06* (2013.01); *C08L 33/14* (2013.01); *C08L 33/16* (2013.01); *B32B 2264/104* (2013.01); *B32B 2307/304* (2013.01); *B32B 2307/412* (2013.01); *B32B 2605/08* (2013.01); *C01P 2004/64* (2013.01); *C03C 2217/445* (2013.01); *C03C 2217/475* (2013.01); *C08J 2329/14* (2013.01); *C08J 2433/00* (2013.01); *C08K 2003/2258* (2013.01)

(58) Field of Classification Search
CPC .......... C08L 33/00; C08L 33/06; C08L 33/14; C08L 33/16; B32B 27/308; B32B 2264/104; B32B 2307/304; B32B 2307/412; B32B 2605/08; C01G 41/00; C03C 17/009; C08J 5/18
See application file for complete search history.

(56) References Cited

U.S. PATENT DOCUMENTS

| | | | |
|---|---|---|---|
| 2014/0106175 A1* | 4/2014 | Fujita | ................ B32B 17/10633 428/432 |
| 2014/0127522 A1* | 5/2014 | Fujita | .................... B82Y 30/00 428/523 |

FOREIGN PATENT DOCUMENTS

| | | |
|---|---|---|
| JP | H04-160041 A | 6/1992 |
| JP | H08-217500 A | 8/1996 |
| JP | H08-259279 A | 10/1996 |
| JP | H10-297945 A | 11/1998 |
| JP | 2001-089202 A | 4/2001 |
| JP | 2010-202495 A | 9/2010 |
| JP | 2012-062230 A | 3/2012 |
| JP | 2012-246183 A | 12/2012 |
| JP | 2013-116977 A | 6/2013 |

OTHER PUBLICATIONS

Aug. 12, 2014 Search Report issued in International Patent Application No. PCT/JP2014/063792.
Aug. 12, 2014 Written Opinion issued in International Patent Application No. PCT/JP2014/063792.

* cited by examiner

*Primary Examiner* — Shane Fang
(74) *Attorney, Agent, or Firm* — Oliff PLC

(57) ABSTRACT

By use of composite tungsten oxide particles having high heat ray-shielding effect while mainly composed of polyvinyl acetal resin, a heat ray-shielding particle is provided, having excellent optical performance and high weather resistance, which includes composite tungsten oxide particle expressed by general formula $M_yWO_z$ (wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having hexagonal crystal structure; and at least one of a dispersant having acrylic backbone, having amino group as functional group, and having thermal decomposition temperature of 200° C. or more, and dispersant having acrylic backbone, having hydroxyl group or carboxyl group as functional group, and having thermal decomposition temperature of 200° C. or more, wherein content of organic solvent having boiling point of 120° C. or less is 5 mass % or less.

7 Claims, No Drawings

HEAT RAY-SHIELDING PARTICLE-CONTAINING COMPOSITION AND METHOD OF PRODUCING THE SAME, HEAT RAY-SHIELDING FILM, AND HEAT RAY-SHIELDING LAMINATED TRANSPARENT BASE MATERIAL

TECHNICAL FIELD

The present invention relates to a heat ray-shielding particle-containing composition and a method of producing the same, used for a laminated transparent base material having an excellent visible light transmittance and an excellent heat ray-shielding function. Further, the present invention relates to a heat ray-shielding film to which the heat ray-shielding particle-containing composition is applied, and a heat ray-shielding laminated transparent base material using this heat ray-shielding film.

DESCRIPTION OF RELATED ART

A laminated glass configured to interpose an intermediate film containing polyvinyl acetal resin, etc., between two plate glasses, is used as a safety glass used in an automobile, etc. Further, there is proposed a transparent base material which is provided for the purpose of shielding an incident solar energy by imparting a heat ray-shielding function to the intermediate layer, and reducing a cooling load and a human hot feeling.

For example, patent document 1 discloses a laminated glass, with a soft resin layer containing heat ray shielding metal oxide composed of fine tin oxide or indium oxide having a particle size of 0.1 μm or less, between a pair of opposing plate glasses.

Also, patent document 2 discloses a laminated glass with an intermediate layer interposed between at least two opposing plate glasses, the intermediate layer being formed in a dispersion state of metal such as Sn, Ti, Si, Zn, Zr, Fe, Al, Cr, Co, Ce, In, Ni, Ag, Cu, Pt, Mn, Ta, W, V, and Mo, oxide of this metal, nitride of this metal, sulfide of this metal, and the metal doped with Sb or F, and further a composite of them.

Further, patent document 3 discloses a window glass for automobiles, with fine particles such as $TiO_2$, $ZrO_2$, $SnO_2$, and $In_2O_3$, and a glass component made of organic silicon or an organic silicon compound, interposed between opposing transparent plate-like members.

Further, patent document 4 discloses a laminated glass, with a three-layer intermediate layer interposed between at least two opposing transparent plate-like bodies, wherein a second layer of the intermediate layer is formed in a dispersion state of metal such as Sn, Ti, Si, Zn, Zr, Fe, Al, Cr, Co, Ce, In, Ni, Ag, Cu, Pt, Mn, Ta, W, V, and Mo, oxide of this metal, nitride of this metal, sulfide of this metal, or the metal doped with Sb or F, or further a composite of them, and a first layer and a third layer of the intermediate layer is formed as resin layers.

On the other hand, an applicant of this invention also discloses in patent document 5, a heat ray-shielding laminated glass, with an intermediate layer having a heat ray-shielding function interposed between two plate glasses, the intermediate layer being composed of a heat ray-shielding film containing hexaboride particles alone, or hexaboride particles and ITO particles and/or ATO particles, and vinyl resin, or the intermediate layer being composed of a heat ray-shielding film containing the abovementioned particles formed on a surface facing an inside of at least one of the plate glasses, and a film containing vinyl resin interposed between the abovementioned two plate glasses.

An applicant of this invention also discloses in patent document 6 a laminated glass, with an intermediate film being a combination of UV-curing resin, a composite tungsten compound, and hexaboride.

PRIOR ART DOCUMENT

Patent Document

Patent document 1: Japanese Patent Laid Open Publication No. 1996-217500
Patent document 2: Japanese Patent Laid Open Publication No. 1996-259279
Patent document 3: Japanese Patent Laid Open Publication No. 1992-160041
Patent document 4: Japanese Patent Laid Open Publication No. 1998-297945
Patent document 5: Japanese Patent Laid Open Publication No. 2001-89202
Patent document 6: Japanese Patent Laid Open Publication No. 2010-202495

SUMMARY OF THE INVENTION

Problem to be Solved by the Invention

However, as a result of a further examination by the inventors of the present invention, the following problem is found. Namely, a first problem is that the laminated glass of the conventional technique described in patent documents 1 to 4, does not have a sufficient heat ray-shielding function when high visible light transmittance is requested. Further, a haze value showing a clouding state of a transparent base material, is requested to be 1% or less for automobile window materials, and 3% or less for building window materials. From this viewpoint, there is a further room for improvement in the heat ray-shielding laminated glass. Moreover, the heat ray-shielding laminated glass, etc., of a conventional technique has an insufficient weather resistance in a case of a long time use, wherein reduction (deterioration) of a visible light transmittance is observed.

A second problem is that the heat ray-shielding laminated glass, etc., used for each kind of window material, requires a mechanical performance in addition to an optical performance. Specifically, penetration resistance is required for the laminated glass such as a safety glass, etc. Conventionally, polyvinyl acetal resin is used in an intermediate layer for giving the penetration resistance to the laminated glass. However, it is found that the optical performance is reduced if composite tungsten oxide particles are contained in the polyvinyl actal resin. Therefore, as a second best method, for example patent document 6 teaches and discloses a heat ray-shielding film in which polyvinyl acetal resin is substituted with UV-curing resin, so that the composite tungsten compound and hexaboride are contained in the UV-curing resin. However, there is a high request for the polyvinyl acetal resin in the market, as a resin for the intermediate layer, from a viewpoint of satisfying a mechanical strength of the safety glass.

In view of the above-described problem, the present invention is provided, and an object of the present invention is to provide a heat ray-shielding film containing composite tungsten oxide particles having a high heat ray-shielding effect while mainly composed of polyvinyl acetal resin and capable of exhibiting an excellent optical performance and high weather resistance, and a method of producing this heat ray-shielding film, and provide a heat ray-shielding particle-containing composition which realizes a heat ray-shielding laminated transparent base material in which the heat ray-shielding film is used, and having excellent storage stability.

Means for Solving the Problem

Namely, in order to solve the above-described problem, a first invention is a heat ray-shielding particle-containing composition, containing a composite tungsten oxide particle expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$), and having a hexagonal crystal structure, and two kind or more dispersants, including:

at least one kind of an amino group polymer dispersant as the dispersant, having an amino group as a functional group, and having a thermal decomposition temperature of 200° C. or more; and at least one kind of a hydroxyl polymer dispersant and/or a carboxyl group polymer dispersant as the dispersant, having an acrylic backbone, having a hydroxyl group (—OH group) and/or a carboxyl group (—COOH) as a functional group, and having a thermal decomposition temperature of 200° C. or more, wherein a content of an organic solvent having a boiling point of 120° C. or less is 5 mass % or less.

A second invention is the heat ray-shielding particle-containing composition of the first invention, wherein an amine value of the amino group polymer dispersant is 5 to 100 mgKOH/g.

A third invention is the heat ray-shielding particle-containing composition of the first or second invention, wherein 50 wt. part or more and 9900 wt. part or less of the amino group polymer dispersant is contained based on 100 wt. part of the composite tungsten oxide particles.

A fourth invention is the heat ray-shielding particle-containing composition of any one of the first to third inventions, wherein the organic solvent is one kind or more selected from toluene, methyl ethyl ketone, methyl isobutyl ketone, butyl acetate, isopropyl alcohol, and ethanol.

A fifth invention is a heat ray-shielding film, wherein the heat ray-shielding particle-containing composition of any one of the first to fourth inventions, polyvinyl acetal resin, and a plasticizer are kneaded, which is then molded into a film shape.

A sixth invention is a heat ray-shielding laminated transparent base material, wherein the heat ray-shielding film of the fifth invention exists between two or more transparent base materials.

A seventh invention is a method of producing the heat ray-shielding particle-containing composition of any one of the first to third inventions, including:

a first step of obtaining a dispersion liquid by dispersing composite tungsten oxide particles expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexagonal crystal structure, and the dispersant in an organic solvent having a boiling point of 120° C. or less;

a second step of obtaining a mixture by adding and mixing the dispersant or the dispersant dissolved in the organic solvent, into a dispersion liquid obtained by the first step; and a third step of obtaining a heat ray-shielding particle-containing composition by drying until a content of the organic solvent contained in the mixture obtained by the second step, becomes 5 mass % or less.

An eighth invention is the method of producing the heat ray-shielding particle-containing composition according to the seventh invention, wherein a composite tungsten oxide particle having an average particle size of 40 nm or less, is used as the composite tungsten oxide particle in the dispersion liquid.

Advantage of the Invention

By adding, mixing, and kneading a heat ray-shielding particle-containing composition of the present invention into polyvinyl acetal resin together with a plasticizer, It is possible to obtain a heat ray-shielding film containing composite tungsten oxide particles having a high heat ray-shielding effect while being mainly composed of polyvinyl acetal resin, and capable of exhibiting an excellent optical performance and a high weather resistance, and a heat ray-shielding laminated transparent base material using the heat ray-shielding film.

DETAILED DESCRIPTION OF THE INVENTION

Embodiments of the present invention will be described hereafter, sequentially in an order of a heat ray-shielding particle-containing composition and a method of producing the same, a heat ray-shielding film using the heat ray-shielding particle-containing composition and a heat ray-shielding laminated transparent base material using the heat ray-shielding film.

[1] Heat Ray-Shielding Particle-Containing Composition

The heat ray-shielding particle-containing composition of the present invention contains particles having a heat ray-shielding function, a dispersant, an organic solvent, and further the other additive as desired.

Each component of the heat ray-shielding particle-containing composition, will be described hereafter.

(1) Particles having a Heat Ray-Shielding Function

Particles having a heat ray-shielding function used in the heat ray-shielding particle-containing composition of the present invention, are composite tungsten oxide particles. Since the composite tungsten oxide particles significantly absorb particularly a light of a wavelength of 1000 nm or more, its transmission color tone is bluish color tone in many cases.

The particle size of each composite tungsten oxide particle can be suitably selected, depending on a purpose of use of the heat ray-shielding film. For example, when the heat ray-shielding film is used for the purpose of use requiring transparency, the composite tungsten oxide particle has the dispersed particle size of 40 nm or less preferably. If the composite tungsten oxide particle has the dispersed particle size of 40 nm or less, lights are not completely shielded due to scattering, and visibility of a visible light region can be maintained and simultaneously transparency can be efficiently maintained.

When the heat ray-shielding film of the present invention is applied to a car roof or a side window for example, especially with an emphasis on the transparency in a visible light region, reduction of scattering by the composite tungsten oxide particles is preferably taken into consideration. When further reduction of scattering is taken into consideration, the dispersed particle size of the composite tungsten oxide particle is set to 30 nm or less, and preferably 25 nm or less.

This is because if the dispersed particle size of the composite tungsten oxide particle is small, light scattering in the visible light region of a wavelength of 400 nm to 780 nm due to the geometrical scattering or the Mie scattering, is reduced in the visible light region of 400 nm to 780. By reducing the scattering of the light of this wavelength, the heat ray-shielding film has an outer appearance of a cloudy glass, and it is possible to avoid a situation in which clear transparency is lost.

This is because if the dispersed particle size of the composite tungsten oxide particle is 40 nm or less, the abovementioned geometrical scattering or the Mie scattering is reduced, and scattering becomes Rayleigh scattering. In the Rayleigh scattering, a scattered light is reduced in inverse proportion to the sixth power of a particle size, and therefore the scattering is reduced with a decrease of the dispersed particle size, and transparency is improved. Further, if the dispersed particle size is 25 nm or less, the scattered light is extremely small, and this is preferable. As described above, the dispersed particle size is preferably small, from a viewpoint of avoiding the scattering of the light. Meanwhile, if the dispersed particle size of the composite tungsten oxide particle is 1 nm or more, an industrial manufacture is facilitated.

Further, an amount of the composite tungsten oxide particle contained in the heat ray-shielding film, is preferably 0.2 $g/m^2$ to 2.5 $g/m^2$ per unit area.

The composite tungsten oxide particles which are particles having a heat ray-shielding function, and the method of producing the same, will be further described hereafter.

(a) Composite Tungsten Oxide Particle

Composite tungsten oxide expressed by a general formula $M_yWO_z$ (wherein M is one or more kinds of element selected from Cs, Rb, K, Ti, In, Ba, Li, Ca, Sr, Fe, Sn, Al, and Cu, satisfying $0.1 \leq y \leq 0.5$, $2.2 \leq z \leq 3.0$), and having a hexagonal crystal structure, can be given as the composite tungsten oxide of the present invention. In this composite tungsten oxide, if the values of y and z are in a range of $0.1 \leq y \leq 0.5$, and $2.2 \leq z \leq 3.0$, a useful heat ray-shielding function can be obtained. An addition amount of dispersant M is preferably in a range of 0.1 or more and 0.5 or less, and further preferably in the vicinity of 0.33. This is because the value theoretically calculated from a hexagonal crystal structure is 0.33, and a preferable optical performance can be obtained by the addition amount around this value. Further, the range of z is preferably $2.2 \leq z \leq 3.0$. This is because in the composite tungsten oxide material expressed by $M_yWO_z$ as well, a similar mechanism as the tungsten oxide material expressed by $WO_x$ works, and in addition, in the range of $z \leq 3.0$ as well, there is a supply of free electrons by adding the element M. However, the range is more preferably $2.45 \leq z \leq 3.00$ from a viewpoint of the optical performance.

As an example of a preferable composite tungsten oxide particle satisfying the abovementioned condition, particles such as $Cs_{0.33}WO_3$, $Rb_{0.33}WO_3$, $K_{0.33}WO_3$, and $Ba_{0.33}WO_3$, etc., can be given.

(b) Method of Producing the Composite Tungsten Oxide Particle

The composite tungsten oxide particles expressed by a general formula $M_yWO_z$ can be obtained by applying heat treatment to a tungsten compound starting material in an inert gas atmosphere or a reducing gas atmosphere.

First, the tungsten compound starting material will be described.

As the tungsten compound starting material, any one or more of tungsten trioxide powder, tungsten dioxide powder, hydrate powder of the tungsten oxide, tungsten hexachloride, ammonium tungstate powder, hydrated tungsten oxide obtained by dissolving the tungsten hexachloride in alcohol, which is then dried, hydrate powder of the tungsten oxide obtained by dissolving the tungsten hexachloride in alcohol, and adding water so that the tungsten hexachloride is precipitated, which is then dried, tungsten compound powder obtained by drying the ammonium tungstate aqueous solution, and a metal tungsten powder, can be given as preferable examples.

When the composite tungsten oxide particles are produced, the use of an anhydrous solution is preferable and a tungsten hexachloride solution is more preferable from a viewpoint of easily achieving a uniform mixture of each element whose starting raw materials are in a solution state. By using these raw materials, heat treatment is applied in the inert gas atmosphere or in the reducing gas atmosphere, to thereby obtain the composite tungsten oxide particles. Further, a tungsten compound containing element M in the form of an element single body or a compound, is used as a starting raw material.

Here, in order to produce the starting material with a uniform mixture of each component at a molecular level, each raw material is preferably mixed in a form of a solution. Therefore, the tungsten compound starting material containing element M is preferably dissolvable in a solvent such as water or an organic solvent. For example, tungstate, tungsten chloride salt, tungsten nitrate, tungsten sulfate, tungsten oxalate, tungsten oxide, tungsten carbonate, and tungsten hydroxide, etc., can be given if containing element M. However, the tungsten compound starting material is not limited thereto, and is preferable as long as it is in a solution form.

Heat treatment in an inert gas atmosphere or a reducing gas atmosphere will be described next.

First, when heat treatment is applied in an inert gas atmosphere, a temperature condition is preferably set at 650° C. or more. The starting material subjected to the heat treatment at 650° C. or more has a sufficient near infrared absorption force, and has excellent efficiency as the heat ray-shielding particle. Inert gas such as Ar and $N_2$, etc., may be used as the inert gas.

Further, when the heat treatment is applied in a reducing atmosphere, it is preferable that the heat treatment is applied to the starting material at a temperature of 100° C. or more and 650° C. or less in the reducing gas atmosphere first, and subsequently at 650° C. or more and 1200° C. or less in the inert gas atmosphere. Although the reducing gas used at this time is not particularly limited, $H_2$ is preferable. Then, when $H_2$ is used as the reducing gas, for example, $H_2$ is mixed into the inert gas such as Ar and $N_2$, etc., by a volume ratio of 0.1% or more, and further preferably $H_2$ is mixed into the inert gas such as Ar and $N_2$, etc., by a volume ratio of 0.2% or more. Reduction can be efficiently advanced if $H_2$ is mixed by a volume ratio of 0.1% or more.

The starting raw material powder reduced by hydrogen includes a Magneli phase, thus showing an excellent heat ray-shielding performance. Accordingly, the starting raw material powder in this state can be used as the heat ray-shielding particles.

It is preferable that surface treatment is applied to the composite tungsten oxide particle of the present invention in such a manner that the particle is coated with a compound containing one or more kinds selected from Si, Ti, Zr, and Al, and preferably it is coated with oxide, from a viewpoint of improving a weather resistance. In order to apply the surface treatment, a publicly-known surface treatment may be performed using an organic compound having one or more kinds selected from Si, Ti, Zr, and Al. For example, the composite tungsten oxide particles of the present invention and an organic silicon compound are mixed, and a hydrolysis treatment is applied to the mixture.

(2) Dispersant

A polymer dispersant having an amino group as a functional group (referred to as an "amino group polymer dispersant" in some cases in the present invention) and a polymer dispersant having a hydroxyl group (—OH group) as a functional group (referred to as a "hydroxyl group polymer dispersant" in some cases in the present invention), are used together as the dispersant used for the heat ray-shielding particle-containing composition of the present invention, or the amino group polymer dispersant and a polymer dispersant having a carboxyl group (referred to as a "carboxyl group polymer dispersant" in some cases in the present invention) are used together, or all of the amino group polymer dispersant, the hydroxyl polymer dispersant, and the carboxyl group polymer dispersant are used together.

The dispersants of the present invention such as the amino group polymer dispersant, the hydroxyl group polymer dispersant, and the carboxyl polymer dispersant are preferably the dispersants having a thermal decomposition temperature of 200° C. or more measured using a differential thermal-thermogravimetric simultaneous measurement apparatus (referred to as TG-DTA hereafter in some cases), and having acrylic backbone, or acrylic-styrene backbone.

Here, the thermal decomposition temperature is the temperature at which a weight reduction is started due to a thermal decomposition of the dispersant, in the measurement using TG-DTA.

When the thermal decomposition temperature is 200° C. or more, the dispersant is not decomposed during kneading of the heat ray-shielding particle-containing composition containing the dispersant, and polyvinyl acetal resin. As a result, in the heat ray-shielding film or the heat ray-shielding laminated transparent base material of the present invention, browning due to decomposition of the dispersant, decrease of the visible light transmittance, and a situation in which an original optical performance cannot be obtained, can be avoided.

The amino group polymer dispersant, the hydroxyl group polymer dispersant, and the carboxyl group polymer dispersant of the present invention will be described hereafter in detail.

(a) Amino Group Polymer Dispersant

The amino group polymer dispersant of the present invention adsorbs on the surface of the abovementioned composite tungsten oxide particle, thus preventing an agglomeration of the composite tungsten oxide particles, and having an effect of uniformly dispersing these particles in the heat ray-shielding film. Preferably, An amine value of the amino group polymer dispersant is 5 to 100 mgKOH/g, and a molecular weight Mw is preferably 2000 to 200000.

The amino group polymer dispersant of the present invention is a compound having a basic group such as an amino group in a molecule of this dispersant.

As a compound having the basic group such as an amino group in the molecule of the dispersant, polyolefin resin, polyester resin, acrylic resin, polyurethane resin, and amide resin having the amino group as the basic group, can be given for example.

As examples of preferable commercially available products of such as amino group polymer dispersant, the amino group polymer dispersant by BYK Japan KK such as Disperbyk-112, Disperbyk-116, Disperbyk-130, Disperbyk-161, Disperbyk-162, Disperbyk-164, Disperbyk-166, Disperbyk-167, Disperbyk-168, Disperbyk-2001, Disperbyk-2020, Disperbyk-2050, Disperbyk-2070, Disperbyk-2150, the amino group polymer dispersant by Ajinomoto Fine-Techno Co., Ltd. such as Ajisper PB821, AJisupa PB822, Ajisper PB711, the amino group dispersant by Kusumoto Chemicals, Ltd. such as Disparlon 1860, DISPARLON DA703-50, Disparlon DA7400, etc., the amino group dispersant by BASF Japan Co., Ltd. such as EFKA-4400, EFKA-4401, EFKA-5044, EFKA-5207, EFKA-6225, EFKA-4330, EFKA-4047, EFKA-4060, etc., can be given.

The content of the amino group polymer dispersant in the heat ray-shielding particle-containing composition of the present invention, is preferably 50 wt.pts. or more and 9900 wt.pts. or less, and more preferably 50 wt.pts. or more and 1000 wt.pts. or less, and further more preferably 50 wt.pts. or more and 500 wt.pts. based on 100 wt.pts. of the composite tungsten oxide particles. This is because by setting the content of the amino group polymer dispersant in this range, the composite tungsten oxide particles are uniformly dispersed in the heat ray-shielding film, and an excellent transparency of the heat ray-shielding film can be obtained. Specifically, by containing 50 wt.pts. or more of the amino group polymer dispersant based on 100 wt.pts. of the composite tungsten oxide particles, a haze value of the heat ray-shielding film can be reduced, and by containing 9900 wt.pts. of the amino group polymer dispersant, the heat ray-shielding function of the obtained heat ray-shielding film, and a penetration resistance of an intermediate layer constituted of the heat ray-shielding film in the heat ray-shielding laminated transparent base material, can be secured.

It is unclear why the composite tungsten oxide can be dispersed in the polyvinyl acetal resin by adding a suitable amount of the amino group polymer dispersant of the present invention, into the heat ray-shielding particle-containing composition of the present invention. The inventors of the present invention consider as follows: the polyvinyl acetal resin molecules attract each other by an intermolecular force, in addition to an action of the amino group of the amino group polymer dispersant on the surface of the composite tungsten oxide particle, thus making it possible to disperse the composite tungsten oxide particles. Then, it is also considered that when the composite tungsten oxide particles are satisfactorily dispersed, as a result, the haze value of the heat ray-shielding film is decreased.

(b) Hydroxyl Group Polymer Dispersant, Carboxyl Group Polymer Dispersant

Each of the hydroxyl group polymer dispersant of the present invention and the carboxyl group polymer dispersant of the present invention has an effect of adsorbing on the surface of the abovementioned composite tungsten oxide particle, thus preventing the agglomeration of the composite tungsten oxide particles, and uniformly dispersing these particles in the heat ray-shielding film, and also has an effect of improving a heat resistance of the resin containing the composite tungsten oxide particles and the amino group polymer dispersant, thus preventing a degradation by aging (yellowish change) due to heat.

OH value of the hydroxyl group polymer dispersant of the present invention is preferably 10 to 200 mgKOH/g, and molecular weight Mw thereof is preferably 1000 to 150000.

As the hydroxyl group polymer dispersant of the present invention, acrylic resin having a hydroxyl group (sometimes referred to as acrylic polyol), and acryl and styrene copolymer resin having the hydroxyl group, can be given.

As the hydroxyl group polymer dispersant, acrylic polyols and a commercially available product such as UH series by TOAGOSEI Co., can be given.

An acid value of the carboxyl group polymer dispersant of the present invention is preferably 0.1 to 100 mgKOH/g, and molecular weight Mw thereof is preferably 2000 to 200000.

As the carboxyl group polymer dispersant of the present invention, acrylic resin and acryl and styrene copolymer resin, etc., having the carboxyl group, can be given.

As the carboxyl group polymer dispersant, resin by Mitsubishi Rayon Co., Ltd. such as a commercially available Dianal BR series, and resin by TOAGOSEI Co. such as UC series and UF series, can be given.

The content of the hydroxyl group polymer dispersant and/or the carboxyl group polymer dispersant in the heat ray-shielding particle-containing composition of the present invention, is preferably in a range of 5 wt.pts. or more and 1000 wt.pts. or less, and more preferably 20 wt.pts. or more and 400 pts.wt. or less, based on 100 wt.pts. of the composite tungsten oxide particles. This is because by containing the hydroxyl group polymer dispersant and/or the carboxyl group polymer dispersant in the above range, the heat resistance of the heat ray-shielding film of the present invention containing the composite tungsten oxide particles and the amino group polymer dispersant can be improved, and the optical performance and the mechanical performance of the heat ray-shielding film can be satisfactorily maintained. Further, by combining the abovementioned dispersants, long term storage of the heat ray-shielding particle-containing composition of the present invention can be secured.

(3) Organic Solvent

The organic solvent having a boiling point of 120° C. or less is preferably used, as the heat ray-shielding particle-containing composition of the present invention. This is because if the boiling point is 120° C. or less, it is easy to remove the organic solvent in a drying step, and particularly by vacuum drying. As a result, removal of the organic solvent is quickly advanced in the step of vacuum drying, thereby contributing to a productivity of the composite tungsten oxide particle-containing composition. Further, since the step of vacuum drying is advanced easily and sufficiently, it is possible to prevent an excessive organic solvent from being remained in the composite tungsten oxide particle-containing composition. As a result, it is possible to prevent an occurrence of bubbles during molding the heat ray-shielding film. Specifically, toluene, methyl ethyl ketone, methyl isobutyl ketone, butyl actate, isopropyl alcohol, and ethanol, etc., can be given. However, a material having a boiling point of 120° C. or less and in which the composite tungsten oxide particles can be uniformly dispersed, can be arbitrarily selected.

Regarding a mixture amount of the particles having the heat ray-shielding function, explanation will be given in the column of "[2] Method of producing the heat ray-shielding particle-containing composition (1)" described later.

(4) Other Additive

It is also possible to mix a general additive as desired, to the heat ray-shielding component of the present invention. For example, in order to provide an arbitrary color tone as desired, dye compounds or pigment compounds such as azo-based dyes, cyanine dyes, quinolone-based dyes, perylene-based dyes, and carbon black, etc., generally used for coloring the thermoplastic resin, may be added. Further, hindered phenol-based and phosphorus-based stabilizers, mold releasing agents, hydroxyl benzophenone-based, salicylic acid-based, HALS-based, triazole-based, triazine-based organic ultraviolet absorbers, and inorganic ultraviolet absorbers such as zinc oxide, titanium oxide, cerium oxide, coupling agents, surfactants, antistatic agents, etc., can be added as additive agents.

[2] Method of Producing the Heat Ray-Shielding Particle-Containing Composition

The heat ray-shielding particle-containing composition of the present invention is produced through a first step of obtaining a dispersion liquid by dispersing the particles having the heat ray-shielding function and the dispersant into the organic solvent, a second step of obtaining a mixture by mixing the dispersant or the dispersant dissolved in the organic solvent, into the dispersion liquid obtained by the first step, and a third step of drying the mixture obtained by the second step and removing the organic solvent until a residual amount of the organic solvent is 5 mass % or less in the mixture after drying.

Each producing step of the method of producing the heat ray-shielding particle-containing composition will be described hereafter.

(1) The Step of Obtaining a Dispersion Liquid by Dispersing the Particles Having the Heat Ray-Shielding Function and the Dispersant into the Organic Solvent (First Step)

The method of dispersing the composite tungsten oxide particles in the organic solvent, can be arbitrarily selected if this is the method of uniformly dispersing the particles in the organic solvent. For example, methods such as beads mill, ball mill, sand mil, and ultrasonic dispersion, etc., can be used.

The concentration of the composite tungsten oxide particles in the organic solvent is desirably set to 5 to 50 mass %. If the concentration is 5 mass % or more, it is possible to avoid a situation in which an amount of the organic solvent to be removed is excessively increased, thus increasing a production cost. Also, if the concentration is 50 mass % or less, it is possible to avoid the following situation: agglomeration of the particles easily occurs, thus making it difficult to disperse the particles, or a liquid viscosity is remarkably increased, thus making it difficult to treat the liquid.

Further, the composite tungsten oxide particles in the dispersion liquid are desirably dispersed, with an average particle size of 40 nm or less. This is because if the average particle size is 40 nm or less, the optical performance such as haze, etc., of the heat ray-shielding film after treatment is more preferably improved.

It can also be considered that the composite tungsten oxide particles and the dispersant are dispersed in a plasticizer which is added to the heat ray-shielding film. However, when the composite tungsten oxide particles and the dispersant are dispersed in the plasticizer, a long time is required for the dispersion, because the plasticizer has a high viscosity compared to the organic solvent. Therefore, the first step, and the second step and the third step described later, are preferably employed as the step of producing the heat ray-shielding particle-containing composition of the present invention.

(2) The Step of Obtaining a Mixture by Adding the Dispersant or the Dispersant Dissolved in the Organic Solvent, into the Dispersion Liquid Obtained by the First Step (Second Step)

The amino group polymer dispersant, the hydroxyl group polymer dispersant and/or the carboxyl group polymer dispersant is directly added into the dispersion liquid obtained by the first step, or the amino group polymer dispersant, the hydroxyl group polymer dispersant and/or the carboxyl group polymer dispersant previously dissolved in the organic solvent is mixed, to obtain a mixture. A publicly-known method may be used as a mixing method.

(3) The Step of Drying the Mixture Obtained by the Second Step, and Removing the Organic Solvent Until the Residual Amount of the Organic Solvent after Drying is 5 Mass % or Less (Third Step)

The third step is the step of removing the organic solvent in the mixture obtained by the second step, and obtaining the heat ray-shielding particle-containing composition of the present invention.

The second step is preferably performed by a method of vacuum drying the obtained mixture. Specifically, the heat ray-shielding particle-containing composition and the organic solvent component are separated, by vacuum drying the mixture while stirring. As an apparatus used for the vacuum drying, a vacuum stirring type dryer may be used. However, the apparatus is not particularly limited if it has the abovementioned function. Further, a pressure value is suitably selected during vacuuming in the drying step.

By using the vacuum drying method, efficiency of removing the solvent is improved, and the mixture is not exposed to a high temperature for a long time, thus preferably not allowing the agglomeration of the particles to occur, which is dispersed in the mixture. Further, productivity is increased, and the evaporated organic solvent is easily recovered. This is preferable from a viewpoint of an environmental consideration.

In the heat ray-shielding particle-containing composition obtained after the drying step, the residual organic solvent is requested to be 5 mass % or less. This is because if the residual organic solvent is 5 mass % or less, the bubbles are not generated during treatment of the heat ray-shielding particle-containing composition into the heat ray-shielding laminated transparent base material, and an outer appearance and the optical performance are satisfactorily maintained.

[3] The Heat Ray-Shielding Film Using the Heat Ray-Shielding Particle-Containing Composition The heat ray-shielding film of the present invention is obtained by mixing and kneading the abovementioned heat ray-shielding particle-containing composition, the polyvinyl acetal resin, the plasticizer, optionally other additive or an adhesion control agent, and thereafter molding the mixture into a film shape for example, by a publicly-known method such as an extrusion molding or a calendar molding, etc.

Explanation is given hereafter for the polyvinyl actal resin, the plasticizer, the adhesion control agent, and the method of producing the heat ray-shielding film, and further for the characteristic of the heat ray-shielding film.

(1) Polyvinyl Acetal Resin

Polyvinyl butyral resin is particularly preferable as the polyvinyl acetal resin.

Further, a plurality of kinds of polyvinyl acetal resins having different acetalization degrees may be used in combination, in consideration of the physical property of the heat ray-shielding film. Further, co-polyvinyl acetal resin obtained by combining plural kinds of aldehydes at the time of acetalization and causing a reaction between them, can be preferably used. A preferable lower limit and upper limit of the acetalization of the polyvinyl acetal resin is 60% and 75% respectively.

The polyvinyl acetal resin can be prepared by acetalizing polyvinyl alcohol to aldehyde.

The polyvinyl alcohol is usually obtained by saponifying polyvinyl acetate, and generally polyvinyl alcohol with a saponifying degree of 80 to 99.8 mol % is used.

Further, a preferable lower limit and a preferable upper limit of the polyvinyl alcohol is 200 and 3000 respectively. This is because if a polymerization degree is 200 or more, resistance to penetration through the manufactured heat ray-shielding laminated transparent base material is maintained, and a safety can be maintained, and on the other hand, if the polymerization degree is 3000 or less, moldability of the resin film is maintained, then rigidity of the resin film is also maintained within a preferable range, and processability is maintained.

The aldehyde is not particularly limited, and generally aldehyde having 1 to 10 carbon atoms such as n-butyraldehyde, isobutyraldehyde, 2-ethyl butyraldehyde, n-hexyl aldehyde, n-octyl aldehyde, and acetaldehyde can be used. Above all, n-butyraldehyde, and n-hexyl aldehyde are preferable, and n-valeraldehyde is more preferable, and more preferably butyraldehyde having 4 carbon atoms can be used.

(2) Plasticizer

The plasticizer used for the heat ray-shielding film and further the heat ray-shielding laminated transparent base material described later according to the present invention, includes ester-based plasticizers such as a monohydric alcohol and an organic acid ester compound, and a polyhydric alcohol and organic acid ester compound, etc., and phosphate plasticizers such as an organic phosphoric acid-based plasticizer and an organic phosphoric acid-based plasticizer, etc., and any one of these plasticizers is preferably in a liquid state at a room temperature. Particularly, the ester compound synthesized from the polyhydric alcohol and a fatty acid is more preferable.

The ester compound synthesized from the polyhydric alcohol and the fatty acid, is not particularly limited, and for example a glycol ester compound or an ester compound, etc., of the tetraethylene glycol, tripropylene glycol, and the monobasic organic acid, obtained by a reaction between glycol such as triethylene glycol, tetraethylene glycol, and tripropylene glycol, and monobasic organic acid such as butyric acid, isobutyric acid, caproic acid, 2-ethyl butyric acid, heptyl acid, n-octyl acid, 2-ethylhexyl acid, pelargonic acid (n-nonyl acid), and decyl acid, etc., can be given.

Above all, fatty acid ester of triethylene glycol such as triethylene glycol hexanonate, triethylene glycol di-2-ethyl butyrate, triethylene glycol di-okutaneto, and triethylene glycol di-2-ethyl hexanoate, etc., is suitably used. In selecting the plasticizer, attention should be paid to a hydrolysis, and triethylene glycol di-2-ethylhexanoate, triethylene glycol di-2-ethyl butyrate, tetraethylene glycol di-2-ethylhexanoate are preferable.

As described above, the fatty acid ester of the triethylene glycol has well-balanced various properties such as a compatibility with polyvinyl acetal and a cold resistance, and has excellent processability and economic efficiency.

Also, other plasticizer may be further added, in consideration of a physical property of the heat ray-shielding film. For example, an ester compound of polybasic carboxylic acids such as adepic acid, sebacic acid, and azelaic acid, etc., and alcohol having 4 to 8 carbon atoms or having a branched structure, or a phosphoric acid-based plasticizer may be added.

A total addition amount of these plasticizers into the heat ray-shielding film, may be defined in consideration of a physical property of the heat ray-shielding film. A desirable total addition amount is 10 mass % to 70 mass %.

(3) Adhesion Control Agent

It is preferable to contain the adhesion control agent in the heat ray-shielding film of the present invention. As the adhesion control agent, alkali metal salts and/or alkaline earth metal salt is suitably used. As a counterpart acid constituting the above salts, for example, carboxylic acids such as octyl acid, hexyl acid, butyric acid, acetic acid, formic acid, and inorganic acids such as hydrochloric acid and nitric acid, can be given.

Among the alkali metal salts and/or the alkaline earth metal salts, a magnesium carboxylate having 2 to 16 carbon atoms and a potassium carboxylate having 2 to 16 carbon atoms, are further preferable.

Carboxylic acid magnesium salt and potassium salt of an organic acid having 2 to 16 carbon atoms, are not particularly limited, and for example, magnesium acetate, potassium acetate, magnesium 2-ethyl butyrate, magnesium propionate, potassium propionate, 2-ethylbutane magnesium, potassium 2-ethylbutane, magnesium 2-ethylhexanoate, and 2-potassium ethylhexanoate etc., are suitably used. Above all, it is known that magnesium 2-ethyl butyrate has a high performance as the adhesive force control agent, and also has an effect of the composite tungsten oxide particles such as improving the weather resistance in the heat ray-shielding film mainly composed of polyvinyl acetal resin, and this is preferable.

These adhesive force control agent may be used alone or two or more kinds may be used together.

In the case of using the carboxylic acid salt of sodium, potassium, magnesium, calcium, and cerium as the adhesive force control agent, it is possible to obtain both of the following actions: an action as an original adhesive force control agent, and an action of improving the durability of the composite tungsten oxide particles.

(4) Method of Producing the Heat Ray-Shielding Film

The heat ray-shielding film of the present invention is obtained by kneading and mixing the heat ray-shielding particle-containing composition, the polyvinyl acetal resin, and the plasticizer, and thereafter molding the mixture into a film shape by a publicly-known method such as an extrusion molding method or a calendar molding method, etc.

The film thickness of the heat ray-shielding film of the present invention is preferably 300 μm or more and 2000 μm or less. The reason is as follows: if the film thickness of the heat ray-shielding film is 300 μm or more, it is possible to obtain the penetration resistance required for the heat ray-shielding laminated transparent base material using the heat ray-shielding film, and if the thickness of the heat ray-shielding film is 2000 μm or less, the thickness of the heat ray-shielding film does not exceed the thickness of the transparent base material in the heat ray-shielding laminated transparent base material in which the heat ray-shielding film is used. From this viewpoint, the film thickness of the heat ray-shielding film of the present invention is more preferably 400 μm or more and 1200 μm or less.

(5) Characteristic of the Heat Ray-Shielding Film

The transparent base material, with the heat ray-shielding film of the present invention interposed between a pair of inorganic glasses, has a heat ray-shielding performance of a haze value: 2.0% or less, a visible light transmittance: 70% or more, a solar transmittance in a wavelength range of 300 to 2100 nm: 60% or less of the visible light transmittance. Further, even if the heat ray-shielding laminated transparent base material is left in the atmosphere for 5 days at 120° C., variation of the yellow index is within 10 by a change amount Δb* of b*.

If the haze value exceeds 2.0%, transparency of the intermediate film or the laminated transparent base material is remarkably damaged, and if Δb* is changed exceeding 10, the variation can be confirmed visually. In consideration of this matter, it is found that the heat ray-shielding film of the present invention has a sufficient optical performance and durability.

[4] Heat Ray-Shielding Laminated Transparent Base Material Using the Heat Ray-Shielding Film The heat ray-shielding laminated transparent base material of the present invention is obtained by integrally laminating transparent base materials similar to two inorganic glassed with the heat ray-shielding film interposed between them. The obtained heat ray-shielding laminated inorganic glass can be used mainly as a front inorganic glass of automobiles, and as building windows.

Similarly to the abovementioned glass using the transparent resin as the transparent base material, or using the abovementioned inorganic glass together, with the heat ray-shielding film interposed between the opposing transparent base materials, the heat ray-shielding laminated transparent base material can be obtained. The purpose of use is similar to the heat ray-shielding laminated glass.

It is of course possible to use the heat ray-shielding film alone, or use the heat ray-shielding film present on one surface or both surfaces of the transparent base material such as an inorganic glass or a transparent resin, etc., depending on the purpose of use. A high heat ray absorbing glass, a clear glass, and a green glass, etc., are used as the inorganic glass. The high heat ray absorbing glass refers to the heat ray absorbing glass having a visible light transmittance of 75% or more and a transmittance of 65% or less in an entire wavelength region of 900 to 1300 nm.

[5] Conclusion

As described above in detail, the heat ray-shielding particle-containing composition can be obtained by removing the organic solvent to 5 mass % or less using the vacuum drying method, from the dispersion liquid obtained by dispersing the composite tungsten oxide particles as the heat ray-shielding components, and at least one of the amino group polymer dispersant, the hydroxyl group polymer dispersant, or the carboxyl group polymer dispersant, into the organic solvent having a boiling point of 120° C. or less. Then, by kneading the heat ray-shielding particle-containing composition, the polyvinyl acetal resin, and the plasticizer, and molding the mixture into a film shape by a publicly-known method, it becomes possible to fabricate the heat ray-shielding film for the heat ray-shielding laminated transparent base material having a maximum point of transmittance in the visible light region and having a strong absorption in a near infrared region. Further, by using the polyvinyl acetal resin as the resin for the intermediate layer, the heat ray-shielding laminated transparent base material of the present invention satisfies the mechanical strength of the safety glass.

EXAMPLES

The present invention will be specifically described hereafter, with reference to examples. However, the present invention is not limited to the following examples.

Further, the visible light transmittance, the solar transmittance, and the color tone (10° visual field, light source D65) of the film of the heat ray-shielding laminated transparent base material of each example, were measured using a spectrophotometer U-4000 manufactured by Hitachi Corporation. The solar transmittance is an index showing the heat ray-shielding performance of the heat ray-shielding laminated transparent base material.

Further, the haze value was measured based on JIS K 7105, using HR-200 by MURAKAMI COLOR RESEARCH LABORATORY.

Example 1

Composite tungsten oxide particles $Cs_{0.33}WO_3$ (descried as particle a hereafter) 10 mass %, and the amino group polymer dispersant 4 mass % (dispersant having an acrylic backbone, the amino group as a functional group, amine value of 40 mgOH/g, and a thermal decomposition temperature of 230° C., and abbreviated as dispersant A hereafter), and methyl isobutyl ketone (MIBK) 86 mass % were weighed. They were loaded into a paint shaker in which 0.3 mmφ$ZrO_2$ beads were put, and were subjected to pulverization/dispersion treatment for 7 hours, to thereby prepare the composite tungsten oxide particle dispersion liquid (abbreviated as liquid A hereafter).

Wherein, an average dispersed particle size of the particle a in the liquid A was 22 nm when measuring it by a Microtrack particle size distribution analyzer manufactured by Nikkiso.

Dispersant A and dispersant B were added into the liquid A so that a weight ratio of the particle a, the dispersant A, and the hydroxyl group polymer dispersant (dispersant having an acrylic-styrene backbone, the hydroxyl group as a functional group, molecular weight of Mw14000, an acid value of 90 mgKOH/g, and a thermal decomposition temperature of 250° C., and abbreviated as dispersant B hereafter.) in the component is particle a:dispersant A:dispersant B=1:1:1, and they were loaded into a stirring type vacuum dryer. Then, methyl isobutyl ketone were removed by performing vacuum drying at a normal temperature, to thereby obtain the heat ray-shielding particle-containing composition of example 1 (abbreviated as composition A hereafter). As a result, 100 wt.pts. of dispersant A was contained as the amino group polymer dispersant, based on 100 wt.pts. of particle a.

Content of the methyl isobutyl ketone in the obtained composition A was 2.7 mass %.

The obtained composition A 0.6 mass %, triethylene glycol-di-2-ethyl hexanonate 28.4 mass % and polyvinyl butyral resin 71 mass % as plasticizers were weighed and mixed to obtain a resin composition, which was then loaded into a twin-screw extruder. The resin composition was kneaded at 200° C. and extruded by T-die and the thickness was set to 0.7 mm by the calendar method, to thereby obtain the heat ray-shielding film (abbreviated as a shielding film A hereafter) for the heat ray-shielding laminated transparent base material of example 1.

The obtained shielding film A was interposed between two inorganic glasses, to thereby obtain a heat ray-shielding laminated glass of example 1 by a publicly known method (abbreviated as a laminated transparent base material A1 hereafter). As shown in table 1, as an optical performance of the laminated transparent base material A1, the solar transmittance was 44.7% when the visible light transmittance was 77.9%, and the haze value was 0.9%.

On the other hand, the shielding film A was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material A2 hereafter) of example 1 by a publicly-known method. At this time, when the yellow index b* of the laminated transparent base material A1 and the laminated transparent base material A2 were measured, difference Δb* between them was 4.64. A result thereof is shown in table 1.

Composition A was stored at a room temperature for 12 months. Then, the stored composition A 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film A' hereafter) for the heat ray-shielding laminated transparent base material of example 1.

The obtained shielding film A' was interposed between two inorganic glasses, to thereby obtain the heat ray-shielding laminated glass (abbreviated as a laminated transparent base material A3 hereafter) of example 1 by a publicly-known method. As shown in table 1, as an optical performance of the laminated transparent base material A3, the solar transmittance was 45.2% when the visible light transmittance was 78.3%, and the haze value was 0.8%. A result thereof is shown in table 1.

Example 2

The dispersant was added into the liquid A obtained in example 1 so that the weight ratio of the particle a, dispersant A, and dispersant B in the component is particle a:dispersant A:dispersant B=1:1:0.5, and they were loaded into the stirring type vacuum dryer. Then, methyl isobutyl ketone was removed by performing the vacuum drying at a normal temperature, to thereby obtain the heat ray-shielding particle-containing composition of example 2 (abbreviated as composition B hereafter). As a result, in composition B, 100 wt.pts. of dispersant A which was the amino group polymer dispersant, was contained, based on 100 wt.pts. of particle a. Further, content of the methyl isobutyl ketone in the obtained composition B was 3.1 mass %.

The obtained composition B 0.5 mass %, triethylene glycol-di-2-ethyl hexanonate 28.5 mass %, and polyvinyl butyral resin 71 mass % were weighed and mixed to obtain a resin composition, which was then loaded into the twin-screw extruder. Then, the resin composition was extruded by T-die, kneaded at 200° C., and the thickness was set to 0.7 mm by the calendar roll method, to thereby obtain the heat ray-shielding laminated transparent base material of example 2 (abbreviated as a shielding film B hereafter).

The obtained shielding film B was interposed between two inorganic glasses, to thereby obtain the heat ray-shielding laminated glass (abbreviated as a laminated transparent base material B1 hereafter) of example 2 by a publicly-known method. As shown in table 1, as an optical performance of the laminated transparent base material B1, the solar transmittance was 44.9% when the visible light transmittance was 78.2%, and the haze value was 1.0%. A result thereof is shown in table 1.

On the other hand, the shielding film B was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material B2 hereafter) of example 2 by a publicly-known method. At this time, when the yellow index b* of the laminated transparent base material B1 and the laminated transparent base material B2 were measured, difference Δb* between them was 5.01. A result thereof is shown in table 1.

Composition B was stored at a room temperature for 12 months. Then, the stored composition B 0.5 mass %, triethylene glycol-di-2-ethyl hexanonate 28.5 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film B' hereafter) for the heat ray-shielding laminated transparent base material of example 2.

The obtained shielding film B' was interposed between two inorganic glasses, to thereby obtain the heat ray-shielding laminated glass (abbreviated as a laminated transparent base material B3 hereafter) of example 2 by a publicly-known method. As shown in table 1, as an optical performance of the laminated transparent base material B3, the solar transmittance was 44.5% when the visible light transmittance was 77.8%, and the haze value was 1.0%. A result thereof is shown in table 1.

Example 3

The dispersant was added into the liquid A obtained in example 1 so that the weight ratio of the particle a, dispersant A, and dispersant B in the component is particle a:dispersant A:dispersant B=1:0.5:2, and they were loaded into the stirring type vacuum dryer. Then, methyl isobutyl ketone was removed by performing the vacuum drying at a normal temperature, to thereby obtain the heat ray-shielding particle-containing composition of example 3 (abbreviated as composition C hereafter). As a result, in composition C, 50 wt.pts. of dispersant A which was the amino group polymer dispersant, was contained, based on 100 wt.pts. of particle a. Further, content of the methyl isobutyl ketone in the obtained composition C was 3.9 mass %.

The obtained composition C 0.7 mass %, triethylene glycol-di-2-ethyl hexanonate 28.3 mass %, polyvinyl butyral resin 71 mass % as plasticizers were weighed and mixed to obtain a resin composition, which was then loaded into the twin-screw extruder. Then, the resin composition was kneaded at 200° C. and extruded by T-die, and the thickness was set to 0.7 mm by the calendar method, to thereby obtain the heat ray-shielding film (abbreviated as a shielding film C hereafter) for the heat ray-shielding laminated transparent base material of example 3.

The obtained shielding film C was interposed between two inorganic glasses, to thereby obtain a heat ray-shielding laminated glass of example 3 by a publicly known method (abbreviated as a laminated transparent base material C1 hereafter). As shown in table 1, as an optical performance of the laminated transparent base material C1, the solar transmittance was 45.3% when the visible light transmittance was 78.3%, and the haze value was 1.1%.

On the other hand, the shielding film C was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material C2 hereafter) of example 3 by a publicly-known method. At this time, when the yellow index b* of the laminated transparent base material C2 and the laminated transparent base material C2 were measured, difference Δb* between them was 3.22. A result thereof is shown in table 1.

Composition C was stored at a room temperature for 12 months. Then, the stored composition C 0.7 mass %, triethylene glycol-di-2-ethyl hexanonate 28.3 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film C' hereafter) for the heat ray-shielding laminated transparent base material of example 3.

The obtained shielding film C' was interposed between two inorganic glasses, to thereby obtain the heat ray-shielding laminated glass (abbreviated as a laminated transparent base material C3 hereafter) of example 3 by a publicly-known method. As shown in table 1, as an optical performance of the laminated transparent base material C3, the solar transmittance was 45.0% when the visible light transmittance was 78.0%, and the haze value was 1.1%. A result thereof is shown in table 1.

Example 4

The dispersant was added into the liquid A obtained in example 1 so that the weight ratio of the particle a, the dispersant A, and the carboxyl group polymer dispersant (dispersant having an acrylic backbone, the carboxyl group as a functional group, molecular weight of Mw 90000, acid value of 3 mgKOH/g, and thermal decomposition temperature of 270° C., and abbreviated as dispersant C hereafter) in the component is particle a:dispersant A:dispersant C=1:1:1, and they were loaded into the stirring type vacuum dryer. Then, methyl isobutyl ketone was removed by performing the vacuum drying at a normal temperature, to thereby obtain the heat ray-shielding particle-containing composition of example 4 (abbreviated as composition D hereafter). As a result, in composition D, 100 wt.pts. of dispersant A which was the amino group polymer dispersant, was contained, based on 100 wt.pts. of particle a. Further, content of the methyl isobutyl ketone in the obtained composition D was 2.3 mass %.

The obtained composition D 0.6 mass %, triethylene glycol-di-2-ethyl hexanonate 28.4 mass %, polyvinyl butyral resin 71 mass % as plasticizers were weighed and mixed to obtain a resin composition, which was then loaded into the twin-screw extruder. Then, the resin composition was kneaded at 200° C. and extruded by T-die, and the thickness was set to 0.7 mm by the calendar method, to thereby obtain the heat ray-shielding film (abbreviated as a shielding film D hereafter) for the heat ray-shielding laminated transparent base material of example 4.

The obtained shielding film D was interposed between two inorganic glasses, to thereby obtain a heat ray-shielding laminated glass of example 4 by a publicly known method (abbreviated as a laminated transparent base material D1 hereafter). As shown in table 1, as an optical performance of the laminated transparent base material D1, the solar transmittance was 45.2% when the visible light transmittance was 78.0%, and the haze value was 1.0%.

On the other hand, the shielding film D was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material D2 hereafter) of example 4 by a publicly-known method. At this time, when the yellow index b* of the laminated transparent base material D1 and the laminated transparent base material D2 were measured, difference Δb* between them was 4.50. A result thereof is shown in table 1.

Also, composition D was stored at a room temperature for 12 months. Then, the stored composition D 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film D' hereafter) for the heat ray-shielding laminated transparent base material of example 4.

The obtained shielding film D' was interposed between two inorganic glasses, to thereby obtain the heat ray-shielding laminated glass (abbreviated as a laminated transparent base material D3 hereafter) of example 4 by a publicly-known method. As shown in table 1, as an optical performance of the laminated transparent base material D3, the solar transmittance was 44.7% when the visible light transmittance was 77.9%, and the haze value was 1.0%. A result thereof is shown in table 1.

Example 5

The dispersant was added into the liquid A obtained in example 1 so that the weight ratio of the particle a, the dispersant A, and the dispersant C in the component is particle a:dispersant A:dispersant C=1:1:0.5, and they were loaded into the stirring type vacuum dryer. Then, methyl isobutyl ketone was removed by performing the vacuum drying at a normal temperature, to thereby obtain the heat ray-shielding particle-containing composition of example 5 (abbreviated as composition E hereafter). As a result, 100 wt.pts. of dispersant A which was the amino group polymer dispersant was contained, based on 100 wt.pts. of particle a. Further, content of the methyl isobutyl ketone in the obtained composition E was 3.3 mass %.

The obtained composition E 0.5 mass %, triethylene glycol-di-2-ethyl hexanonate 28.5 mass % and polyvinyl butyral resin 71 mass % as plasticizers were weighed and mixed to obtain a resin composition, which was then loaded into the twin-screw extruder. The resin composition was kneaded at 200° C. and extruded by T-die and the thickness was set to 0.7 mm by the calendar method, to thereby obtain the heat ray-shielding film (abbreviated as a shielding film E hereafter) for the heat ray-shielding laminated transparent base material of example 5 by the calendar roll method.

The obtained shielding film E was interposed between two inorganic glasses, to thereby obtain a heat ray-shielding laminated glass of example 5 by a publicly known method (abbreviated as a laminated transparent base material E1 hereafter). As shown in table 1, as an optical performance of the laminated transparent base material E1, the solar transmittance was 45.2% when the visible light transmittance was 78.3%, and the haze value was 0.8%.

On the other hand, the shielding film E was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material E2 hereafter) of example 5 by a publicly-known method. At this time, when the yellow index b* of the laminated transparent base material E1 and the laminated transparent base material E2 were measured, difference $\Delta b^*$ between them was 5.20. A result thereof is shown in table 1.

Composition E was stored at a room temperature for 12 months. Then, the stored composition E 0.5 mass %, triethylene glycol-di-2-ethyl hexanonate 28.5 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film E' hereafter) for the heat ray-shielding laminated transparent base material of example 5.

The obtained shielding film E' was interposed between two inorganic glasses, to thereby obtain the heat ray-shielding laminated glass (abbreviated as a laminated transparent base material E3 hereafter) of example 5 by a publicly-known method. As shown in table 1, as an optical performance of the laminated transparent base material E3, the solar transmittance was 45.2% when the visible light transmittance was 78.3%, and the haze value was 0.8%. A result thereof is shown in table 1.

Example 6

The dispersant was added into the liquid A obtained in example 1 so that the weight ratio of the particle a, dispersant A, and dispersant C in the component is particle a:dispersant A:dispersant C=1:0.5:2, and they were loaded into the stirring type vacuum dryer. Then, methyl isobutyl ketone was removed by performing the vacuum drying at a normal temperature, to thereby obtain the heat ray-shielding particle-containing composition of example 6 (abbreviated as composition F hereafter). As a result, 50 wt.pts. of dispersant A which was the amino group polymer dispersant was contained, based on 100 wt.pts. of particle a. Further, content of the methyl isobutyl ketone in the obtained composition F was 4.3 mass %.

The obtained composition F 0.7 mass %, triethylene glycol-di-ethyl hexanonate 28.3 mass %, and polyvinyl butyral resin 71 mass % were weighed and mixed to obtain a resin composition, which was then loaded into the twin-screw extruder. Then, the resin composition was extruded by T-die, kneaded at 200° C., and the thickness was set to 0.7 mm by the calendar roll method, to thereby obtain the heat ray-shielding laminated transparent base material of example 6 (abbreviated as a shielding film F hereafter).

The obtained shielding film F was interposed between two inorganic glasses, to thereby obtain the heat ray-shielding laminated glass (abbreviated as a laminated transparent base material F1 hereafter) of example 6 by a publicly-known method. As shown in table 1, as an optical performance of the laminated transparent base material F1, the solar transmittance was 44.8% when the visible light transmittance was 77.9%, and the haze value was 0.9%. A result thereof is shown in table 1.

On the other hand, the shielding film F was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material F2 hereafter) of example 6 by a publicly-known method. At this time, when the yellow index b* of the laminated transparent base material F1 and the laminated transparent base material F2 were measured, difference $\Delta b^*$ between them was 3.79. A result thereof is shown in table 1.

Composition F was stored at a room temperature for 12 months. Then, the stored composition F 0.7 mass %, triethylene glycol-di-2-ethyl hexanonate 28.3 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film F' hereafter) for the heat ray-shielding laminated transparent base material of example 6.

The obtained shielding film F' was interposed between two inorganic glasses, to thereby obtain the heat ray-shielding laminated glass (abbreviated as a laminated transparent base material F3 hereafter) of example 6 by a publicly-known method. As shown in table 1, as an optical performance of the laminated transparent base material F3, the solar transmittance was 44.9% when the visible light transmittance was 78.1%, and the haze value was 0.9%. A result thereof is shown in table 1.

Example 7

Similarly to example 7 excluding a point that a weighing ratio was set so that particle a was 10 mass %, dispersant A was 4 mass %, and toluene was 86 mass %, a composite tungsten oxide particle dispersion liquid (abbreviated as liquid G hereafter) was obtained.

Wherein, an average dispersed particle size of the particle a in the component in the liquid G was 19 nm when measuring it by a Micro track particle size distribution analyzer manufactured by Nikkiso.

Dispersant A and dispersant B were added into the liquid G so that the weight ratio of the particle a, dispersant A, and dispersant B in the component was particle a:dispersant A:dispersant B=1:1:1, and they were loaded into the stirring type vacuum dryer. Then, toluene was removed by performing a vacuum drying at a normal temperature, to thereby obtain the heat ray-shielding particle-containing composition (abbreviated as composition G hereafter) of example 7. As a result, 100 wt.pts. of particle a which was the amino group polymer dispersant was contained, based on 100 wt.pts. of particle a. The content of toluene in the obtained composition G was 2.3 mass %.

The obtained composition A 0.6 mass %, triethylene glycol-di-2-ethyl hexanonate 28.4 mass % and polyvinyl butyral resin 71 mass % as plasticizers were weighed and mixed to obtain a resin composition, which was then loaded into the twin-screw extruder. The resin composition was kneaded at 200° C. and extruded by T-die and the thickness was set to 0.7 mm by the calendar method, to thereby obtain the heat ray-shielding film (abbreviated as a shielding film G hereafter) for the heat ray-shielding laminated transparent base material of example 7.

The obtained shielding film G was interposed between two inorganic glasses, to thereby obtain a heat ray-shielding laminated glass of example 7 by a publicly known method (abbreviated as a laminated transparent base material G1 hereafter). As shown in table 1, as an optical performance of the laminated transparent base material G1, the solar transmittance was 44.8% when the visible light transmittance was 78.1%, and the haze value was 1.0%.

On the other hand, the shielding film G was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material G2 hereafter) of example 7 by a publicly-known method. At this time, when the yellow index b* of the laminated transparent base material G1 and the laminated transparent base material G2 were measured, difference Δb* between them was 5.01. A result thereof is shown in table 1.

Composition G was stored at a room temperature for 12 months. Then, the stored composition G 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film G' hereafter) for the heat ray-shielding laminated transparent base material of example 7.

The obtained shielding film G' was interposed between two inorganic glasses, to thereby obtain the heat ray-shielding laminated glass (abbreviated as a laminated transparent base material G3 hereafter) of example 7 by a publicly-known method. As shown in table 1, as an optical performance of the laminated transparent base material G3, the solar transmittance was 45.1% when the visible light transmittance was 78.2%, and the haze value was 0.9%. A result thereof is shown in table 1.

Example 8

Similarly to example 1 extruding a point that the weighing ratio was set so that particle a was 10 mass %, dispersant A was 4 mass %, and methyl ethyl ketone (MEK) was 86 mass %, a composite tungsten oxide particle dispersion liquid of example 8 (abbreviated as liquid H hereafter) was obtained.

Wherein, an average dispersed particle size of the particle a in the liquid H was 25 nm when measuring it by a Micro track particle size distribution analyzer manufactured by Nikkiso.

Dispersant A and dispersant B were added into the liquid H so that the weight ratio of the particle a, the dispersant A, and the dispersant B in the component is particle a:dispersant A:dispersant B=1:1:1, and they were loaded into the stirring type vacuum dryer. Then, MEK was removed by performing vacuum drying at a normal temperature, to thereby obtain the heat ray-shielding particle-containing composition of example 8 (abbreviated as composition H hereafter). As a result, 100 wt.pts. of dispersant A was contained as the amino group polymer dispersant, based on 100 wt.pts. of particle a.

The content of the MEK in the obtained composition H was 2.3 mass %.

The obtained composition H 0.6 mass %, triethylene glycol-di-2-ethyl hexanonate 28.4 mass % and polyvinyl butyral resin 71 mass % as plasticizers were weighed and mixed to obtain a resin composition, which was then loaded into the twin-screw extruder. Then, the resin composition was kneaded at 200° C. and extruded by T-die and the thickness was set to 0.7 mm by the calendar method, to thereby obtain the heat ray-shielding film (abbreviated as a shielding film H hereafter) for the heat ray-shielding laminated transparent base material of example 8.

The obtained shielding film H was interposed between two inorganic glasses, to thereby obtain a heat ray-shielding laminated glass of example 8 by a publicly known method (abbreviated as a laminated transparent base material H1 hereafter). As shown in table 1, as an optical performance of the laminated transparent base material H1, the solar transmittance was 44.7% when the visible light transmittance was 77.9%, and the haze value was 0.9%.

On the other hand, the shielding film H was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material H2 hereafter) of example 8 by a publicly-known method. At this time, when the yellow index b* of the laminated transparent base material H1 and the laminated transparent base material H2 were measured, difference Δb* between them was 4.66. A result thereof is shown in table 1.

Also, composition H was stored at a room temperature for 12 months. Then, the stored composition H 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film H' hereafter) for the heat ray-shielding laminated transparent base material of example 8.

The obtained shielding film H' was interposed between two inorganic glasses, to thereby obtain the heat ray-shielding laminated glass (abbreviated as a laminated transparent base material H3 hereafter) of example 8 by a publicly-known method. As shown in table 1, as an optical performance of the laminated transparent base material H3, the solar transmittance was 45.1% when the visible light transmittance was 78.3%, and the haze value was 0.9%. A result thereof is shown in table 1.

Example 9

Similarly to example 1 extruding a point that the weighing ratio was set so that particle a was 10 mass %, dispersant A was 4 mass %, and butyl acetate was 86 mass %, a composite tungsten oxide particle dispersion liquid of example 8 (abbreviated as liquid I hereafter) was obtained.

Wherein, an average dispersed particle size of the particle a in the liquid I was 31 nm when measuring it by a Micro track particle size distribution analyzer manufactured by Nikkiso.

Dispersant A and dispersant B were added into the liquid I so that the weight ratio of the particle a, the dispersant A, and the dispersant B in the component is particle a:dispersant A:dispersant B=1:1:1, and they were loaded into the stirring type vacuum dryer. Then, the butyl acetate was removed by performing vacuum drying at a normal temperature, to thereby obtain the heat ray-shielding particle-containing composition of example 9 (abbreviated as composition I hereafter). As a result, 100 wt.pts. of dispersant A was contained as the amino group polymer dispersant, based on 100 wt.pts. of particle a. The content of the butyl acetate in the obtained composition I was 4.0 mass %.

The obtained composition I 0.6 mass %, triethylene glycol-di-2-ethyl hexanonate 28.4 mass % and polyvinyl butyral resin 71 mass % as plasticizers were weighed and mixed to obtain a resin composition, which was then loaded into the twin-screw extruder. The resin composition was kneaded at 200° C. and extruded by T-die and the thickness was set to 0.7 mm by the calendar method, to thereby obtain the heat ray-shielding film (abbreviated as a shielding film I hereafter) for the heat ray-shielding laminated transparent base material of example 9.

The obtained shielding film I was interposed between two inorganic glasses, to thereby obtain a heat ray-shielding laminated glass of example 9 by a publicly known method (abbreviated as a laminated transparent base material I1 hereafter). As shown in table 1, as an optical performance of the laminated transparent base material I1, the solar transmittance was 45.2% when the visible light transmittance was 78.3%, and the haze value was 1.0%.

On the other hand, the shielding film I was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material I2 hereafter) of example 9 by a publicly-known method. At this time, when the yellow index b* of the laminated transparent base material I1 and the laminated transparent base material I2 were measured, difference Δb* between them was 6.05. A result thereof is shown in table 1.

Also, composition I was stored at a room temperature for 12 months. Then, the stored composition I 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film I' hereafter) for the heat ray-shielding laminated transparent base material of example 9.

The obtained shielding film I' was interposed between two inorganic glasses, to thereby obtain the heat ray-shielding laminated glass (abbreviated as a laminated transparent base material I3 hereafter) of example 9 by a publicly-known method. As shown in table 1, as an optical performance of the laminated transparent base material I3, the solar transmittance was 45.0% when the visible light transmittance was 78.1%, and the haze value was 1.0%. A result thereof is shown in table 1.

Example 10

Similarly to example 1 extruding a point that the weighing ratio was set so that particle a was 10 mass %, dispersant A was 4 mass %, and isopropyl alcohol (IPA) was 86 mass %, a composite tungsten oxide particle dispersion liquid of example 10 (abbreviated as liquid J hereafter) was obtained.

Wherein, an average dispersed particle size of the particle a in the liquid J was 30 nm when measuring it by a Micro track particle size distribution analyzer manufactured by Nikkiso.

Dispersant A and dispersant B were added into the liquid J so that the weight ratio of the particle a, the dispersant A, and the dispersant B in the component is particle a:dispersant A:dispersant B=1:1:1, and they were loaded into the stirring type vacuum dryer. Then, IPA was removed by performing vacuum drying at a normal temperature, to thereby obtain the heat ray-shielding particle-containing composition of example 10 (abbreviated as composition J hereafter). As a result, 100 wt.pts. of dispersant A was contained as the amino group polymer dispersant, based on 100 wt.pts. of particle a. The content of the IPA in the obtained composition J was 4.0 mass %.

The obtained composition J 0.6 mass %, triethylene glycol-di-2-ethyl hexanonate 28.4 mass % and polyvinyl butyral resin 71 mass % as plasticizers were weighed and mixed to obtain a resin composition, which was then loaded into the twin-screw extruder. The resin composition was kneaded at 200° C. and extruded by T-die and the thickness was set to 0.7 mm by the calendar method, to thereby obtain the heat ray-shielding film (abbreviated as a shielding film J hereafter) for the heat ray-shielding laminated transparent base material of example 10 by the calendar roll method.

The obtained shielding film J was interposed between two inorganic glasses, to thereby obtain a heat ray-shielding laminated glass of example 10 by a publicly known method (abbreviated as a laminated transparent base material J1 hereafter). As shown in table 1, as an optical performance of the laminated transparent base material J1, the solar transmittance was 45.0% when the visible light transmittance was 77.9%, and the haze value was 0.9%.

On the other hand, the shielding film J was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material J2 hereafter) of example 10 by a publicly-known method. At this time, when the yellow index b* of the laminated transparent base material J1 and the laminated transparent base material J2 were measured, difference Δb* between them was 5.23. A result thereof is shown in table 1.

Composition J was stored at a room temperature for 12 months. Then, the stored composition J 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film J' hereafter) for the heat ray-shielding laminated transparent base material of example 10.

The obtained shielding film J' was interposed between two inorganic glasses, to thereby obtain the heat ray-shielding laminated glass (abbreviated as a laminated transparent base material J3 hereafter) of example 10 by a publicly-known method. As shown in table 1, as an optical performance of the laminated transparent base material J3, the solar transmittance was 44.8% when the visible light transmittance was 78.0%, and the haze value was 1.0%. A result thereof is shown in table 1.

Example 11

Similarly to example 1 extruding a point that the weighing ratio was set so that particle a was 10 mass %, dispersant A was 4 mass %, and ethanol was 86 mass %, a composite tungsten oxide particle dispersion liquid of example 11 (abbreviated as liquid K hereafter) was obtained.

Wherein, an average dispersed particle size of the particle a in the liquid K was 19 nm when measuring it by a Micro track particle size distribution analyzer manufactured by Nikkiso.

Dispersant A and dispersant B were added into the liquid K so that the weight ratio of the particle a, the dispersant A, and the dispersant B in the component is particle a:dispersant A:dispersant B=1:1:1, and they were loaded into the stirring type vacuum dryer. Then, the ethanol was removed by performing vacuum drying at a normal temperature, to thereby obtain the heat ray-shielding particle-containing composition of example 11 (abbreviated as composition K hereafter). As a result, 100 wt.pts. of dispersant A was contained as the amino group polymer dispersant, based on 100 wt.pts. of particle a. The content of the ethanol in the obtained composition K was 1.5 mass %.

The obtained composition K 0.6 mass %, triethylene glycol-di-2-ethyl hexanonate 28.4 mass % and polyvinyl butyral resin 71 mass % as plasticizers were weighed and mixed to obtain a resin composition, which was then loaded into a twin-screw extruder. The resin composition was kneaded at 200° C. and extruded by T-die and the thickness was set to 0.7 mm by the calendar method, to thereby obtain the heat ray-shielding film (abbreviated as a shielding film K hereafter) for the heat ray-shielding laminated transparent base material of example 11.

The obtained shielding film K was interposed between two inorganic glasses, to thereby obtain the heat ray-shielding laminated glass (abbreviated as a laminated transparent base material K1 hereafter) of example 11 by a publicly-known method. As shown in table 1, as an optical performance of the laminated transparent base material K1, the solar transmittance was 44.9% when the visible light transmittance was 78.0%, and the haze value was 0.9%. A result thereof is shown in table 1.

On the other hand, the shielding film K was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material K2 hereafter) of example 11 by a publicly-known method. At this time, when the yellow index b* of the laminated transparent base material K1 and the laminated transparent base material K2 were measured, difference Δb* between them was 4.77. A result thereof is shown in table 1.

Composition K was stored at a room temperature for 12 months. Then, the stored composition K 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die, and the thickness was set to 0.7 mm by the calendar roll method, to thereby obtain the heat ray-shielding film (abbreviated as a shielding film K' hereafter) for the heat ray-shielding laminated transparent base material of example 11.

The obtained shielding film K' was interposed between two inorganic glasses, to thereby obtain the heat ray-shielding laminated glass (abbreviated as a laminated transparent base material K3 hereafter) of example 11 by a publicly-known method. As shown in table 1, as an optical performance of the laminated transparent base material K3, the solar transmittance was 44.9% when the visible light transmittance was 78.0%, and the haze value was 1.0%. A result thereof is shown in table 1.

Example 12

Dispersants were added into the liquid A obtained by example 1, so that the weight ratio of the particle a, dispersant A, dispersant B, and dispersant C in the component was particle a:dispersant A:dispersant B:dispersant C=1:1:1:1, and they were loaded into the stirring type vacuum dryer. Then, methyl isobutyl ketone was removed by performing vacuum drying at a normal temperature, to thereby obtain the heat ray-shielding particle-containing composition of example 12 (abbreviated as composition L hereafter). As a result, 100 wt.pts. of dispersant A was contained as the amino group polymer dispersant, based on 100 wt.pts. of particle a. The content of the methyl isobutyl ketone in the obtained composition L was 3.3 mass %.

The obtained composition L 0.8 mass %, triethylene glycol-di-2-ethyl hexanonate 28.2 mass % and polyvinyl butyral resin 71 mass % as plasticizers were weighed and mixed to obtain a resin composition, which was then loaded into a twin-screw extruder. The resin composition was kneaded at 200° C. and extruded by T-die and the thickness was set to 0.7 mm by the calendar method, to thereby obtain the heat ray-shielding film (abbreviated as a shielding film L hereafter) for the heat ray-shielding laminated transparent base material of example 12.

The obtained shielding film L was interposed between two inorganic glasses, to thereby obtain a heat ray-shielding laminated glass of example 12 by a publicly known method (abbreviated as a laminated transparent base material L1 hereafter). As shown in table 1, as an optical performance of the laminated transparent base material L1, the solar transmittance was 45.0% when the visible light transmittance was 78.0%, and the haze value was 1.0%.

On the other hand, the shielding film L was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material L2 hereafter) of example 12 by a publicly-known method. At this time, when the yellow index b* of the laminated transparent base material L1 and the laminated transparent base material L2 were measured, difference Δb* between them was 3.99. A result thereof is shown in table 1.

Also, composition L was stored at a room temperature for 12 months. Then, the stored composition L 0.8 mass %, triethylene glycol-di-2-ethyl hexanonate 28.2 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film L' hereafter) for the heat ray-shielding laminated transparent base material of example 12.

The obtained shielding film L' was interposed between two inorganic glasses, to thereby obtain the heat ray-shielding laminated glass (abbreviated as a laminated transparent base material L3 hereafter) of example 12 by a publicly-known method. As shown in table 1, as an optical performance of the laminated transparent base material L3, the solar transmittance was 44.9% when the visible light transmittance was 77.9%, and the haze value was 1.0%. A result thereof is shown in table 1.

Comparative Example 1

Dispersants were added into the liquid A obtained by example 1, so that the weight ratio of the particle a and the dispersant A in the component was particle a:dispersant A=1:1, and they were loaded into the stirring type vacuum dryer. Then, methyl isobutyl ketone was removed by performing vacuum drying at a normal temperature, to thereby obtain the heat ray-shielding particle-containing composition of comparative example 1 (abbreviated as composition α hereafter). As a result, 100 wt.pts. of dispersant A was contained as the amino group polymer dispersant, based on 100 wt.pts. of particle a. The content of the methyl isobutyl ketone in the obtained composition α was 3.0 mass %.

The obtained composition α 0.4 mass %, triethylene glycol-di-2-ethyl hexanonate 28.6 mass % and polyvinyl butyral resin 71 mass % as plasticizers were weighed and mixed to obtain a resin composition, which was then loaded into a twin-screw extruder. Then, the resin composition was kneaded at 200° C. and extruded by T-die and the thickness was set to 0.7 mm by the calendar method, to thereby obtain the heat ray-shielding film (abbreviated as a shielding film a hereafter) for the heat ray-shielding laminated transparent base material of comparative example 1.

The obtained shielding film α was interposed between two inorganic glasses, to thereby obtain a heat ray-shielding laminated glass of comparative example 1 by a publicly known method (abbreviated as a laminated transparent base material α1 hereafter). As shown in table 1, as an optical performance of the laminated transparent base material α1, the solar transmittance was 44.7% when the visible light transmittance was 78.0%, and the haze value was 0.9%.

On the other hand, the shielding film α was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material α2 hereafter) of comparative example 1 by a publicly-known method. At this time, when the yellow index b* of the laminated transparent base material α1 and the laminated transparent base material α2 were measured, difference Δb* between them was 25.1. A result thereof is shown in table 1.

Composition α was stored at a room temperature for 12 months. Then, the stored composition α 0.4 mass %, triethylene glycol-di-2-ethyl hexanonate 28.6 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film α' hereafter) for the heat ray-shielding laminated transparent base material of comparative example 1.

The obtained shielding film α' was interposed between two inorganic glasses, to thereby obtain the heat ray-shielding laminated glass (abbreviated as a laminated transparent base material α3 hereafter) of comparative example 1 by a publicly-known method. As shown in table 1, as an optical performance of the laminated transparent base material α3, the solar transmittance was 44.9% when the visible light transmittance was 78.1%, and the haze value was 0.9%. A result thereof is shown in table 1.

Comparative Example 2

Similarly to example 1 extruding a point that the weighing ratio was set so that particle a was 10 mass %, dispersant B was 4 mass %, and methyl isobutyl ketone (MIBK) was 86 mass %, a composite tungsten oxide particle dispersion liquid of comparative example 2 (abbreviated as liquid β hereafter) was obtained.

Wherein, an average dispersed particle size of the particle a in the liquid β was 21 nm when measuring it by a Micro track particle size distribution analyzer manufactured by Nikkiso.

Dispersants were added into the liquid β, so that the weight ratio of the heat ray-shielding particles a and the dispersant B in the component was the heat ray-shielding particles a:dispersant B=1:3, and they were loaded into the stirring type vacuum dryer. Then, methyl isobutyl ketone was removed by performing vacuum drying at a normal temperature, to thereby obtain the heat ray-shielding particle-containing composition of comparative example 2 (abbreviated as composition β (hereafter). As a result, it was found that the amino group polymer dispersant was not contained, based on 100 wt.pts. of particle a. The content of the methyl isobutyl ketone in the obtained composition β was 3.7 mass %.

The obtained composition β 0.8 mass %, triethylene glycol-di-2-ethyl hexanonate 28.2 mass % and polyvinyl butyral resin 71 mass % as plasticizers were weighed and mixed to obtain a resin composition, which was then loaded into a twin-screw extruder. Then, the resin composition was kneaded at 200° C. and extruded by T-die and the thickness was set to 0.7 mm by the calendar method, to thereby obtain the heat ray-shielding film (abbreviated as a shielding film β hereafter) for the heat ray-shielding laminated transparent base material of comparative example 2.

The obtained shielding film β was interposed between two inorganic glasses, to thereby obtain a heat ray-shielding laminated glass of comparative example 2 by a publicly known method (abbreviated as a laminated transparent base material β1 hereafter). As shown in table 1, as an optical performance of the laminated transparent base material β1, the solar transmittance was 46.2% when the visible light transmittance was 77.7%, and the haze value was 3.0%.

On the other hand, the shielding film β was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material β2 hereafter) of comparative example 2 by a publicly-known method. At this time, when the yellow index b* of the laminated transparent base material β1 and the laminated transparent base material β2 were measured, difference Δb* between them was 5.97. A result thereof is shown in table 1.

Composition β was stored at a room temperature for 12 months. Then, the stored composition β 0.8 mass %, triethylene glycol-di-2-ethyl hexanonate 28.2 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film β' hereafter) for the heat ray-shielding laminated transparent base material of comparative example 2.

The obtained shielding film β' was interposed between two inorganic glasses, to thereby obtain the heat ray-shielding laminated transparent base material β3 hereafter) of comparative example 2 by a publicly-known method. As shown in table 1, as an optical performance of the laminated transparent base material β3, the solar transmittance was 46.7% when the visible light transmittance was 78.0%, and the haze value was 2.9%. A result thereof is shown in table 1.

Comparative Example 3

Similarly to example 1 extruding a point that the weighing ratio was set so that particle a was 10 mass %, dispersant A was 3 mass %, and methyl isobutyl ketone (MIBK) was 87 mass %, a composite tungsten oxide particle dispersion liquid of comparative example 3 (abbreviated as liquid γ hereafter) was obtained.

Wherein, an average dispersed particle size of the particle a in the liquid γ was 27 nm when measuring it by a Micro track particle size distribution analyzer manufactured by Nikkiso.

Dispersants were added into the liquid γ, so that the weight ratio of the heat ray-shielding particles a, dispersant A, dispersant B in the component was heat ray-shielding particles:dispersant A:dispersant B=1:0.3:2.2, and they were loaded into the stirring type vacuum dryer. Then, methyl isobutyl ketone was removed by performing vacuum drying at a normal temperature, to thereby obtain the heat ray-shielding particle-containing composition of comparative example 3 (abbreviated as composition γ hereafter). As a result, 30 wt.pts. of dispersant A was contained as the amino group polymer dispersant, based on 100 wt.pts. of particle a. The content of the methyl isobutyl ketone in the obtained composition γ was 3.2 mass %.

The obtained composition γ 0.7 mass %, triethylene glycol-di-2-ethyl hexanonate 28.3 mass % and polyvinyl butyral resin 71 mass % as plasticizers were weighed and mixed to obtain a resin composition, which was then loaded into a twin-screw extruder. Then, the resin composition was kneaded at 200° C. and extruded by T-die and the thickness was set to 0.7 mm by the calendar method, to thereby obtain the heat ray-shielding film (abbreviated as a shielding film γ hereafter) for the heat ray-shielding laminated transparent base material of comparative example 3.

The obtained shielding film γ was interposed between two inorganic glasses, to thereby obtain a heat ray-shielding laminated glass of comparative example 3 by a publicly known method (abbreviated as a laminated transparent base material γ1 hereafter). As shown in table 1, as an optical performance of the laminated transparent base material γ1, the solar transmittance was 46.4% when the visible light transmittance was 77.0%, and the haze value was 3.7%.

On the other hand, the shielding film γ was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material γ2 hereafter) of comparative example 3 by a publicly-known method. At this time, when the yellow index b* of the laminated transparent base material γ1 and the laminated transparent base material γ2 were measured, difference Δb* between them was 5.48. A result thereof is shown in table 1.

Composition γ was stored at a room temperature for 12 months. Then, the stored composition γ 0.7 mass %, triethylene glycol-di-2-ethyl hexanonate 28.3 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film γ' hereafter) for the heat ray-shielding laminated transparent base material of comparative example 3.

The obtained shielding film γ' was interposed between two inorganic glasses, to thereby obtain the heat ray-shielding laminated glass (abbreviated as a laminated transparent base material γ3 hereafter) of comparative example 3 by a publicly-known method. As shown in table 1, as an optical performance of the laminated transparent base material γ3, the solar transmittance was 46.3% when the visible light transmittance was 76.9%, and the haze value was 3.9%. A result thereof is shown in table 1.

Comparative Example 4

Dispersants were added into the liquid A obtained by example 1, so that the weight ratio of the particle a, dispersant A, and a dispersant having an epoxy group as a functional group (having an acrylic backbone and an epoxy group, and having a molecular weight Mw of 9700, an epoxy value of 1.4, and a thermal decomposition temperature of 250° C., and abbreviated as a dispersant D hereafter) in the component, was particle a:dispersant A:dispersant D=1:1:1, and they were loaded into the stirring type vacuum dryer. Then, methyl isobutyl ketone was removed by performing vacuum drying at a normal temperature, to thereby obtain the heat ray-shielding particle-containing composition of comparative example 4 (abbreviated as composition δ hereafter). As a result, 100 wt.pts. of dispersant A was contained as the amino group polymer dispersant, based on 100 wt.pts. of particle a. The content of the methyl isobutyl ketone in the obtained composition δ was 4.2 mass %.

The obtained composition δ 0.6 mass %, triethylene glycol-di-2-ethyl hexanonate 28.4 mass % and polyvinyl butyral resin 71 mass % as plasticizers were weighed and mixed to obtain a resin composition, which was then loaded into a twin-screw extruder. The resin composition was kneaded at 200° C. and extruded by T-die and the thickness was set to 0.7 mm by the calendar method, to thereby obtain the heat ray-shielding film (abbreviated as a shielding film δ hereafter) for the heat ray-shielding laminated transparent base material of comparative example 4.

The obtained shielding film δ was interposed between two inorganic glasses, to thereby obtain a heat ray-shielding laminated glass of comparative example 4 by a publicly known method (abbreviated as a laminated transparent base material δ1 hereafter). As shown in table 1, as an optical performance of the laminated transparent base material δ1, the solar transmittance was 47.3% when the visible light transmittance was 79.6%, and the haze value was 0.9%.

On the other hand, the shielding film δ was put in a constant temperature bath of 120° C., and subjected to a heat resistance test for 5 days, and thereafter interposed between two inorganic glasses, to thereby obtain the heat ray-shielding laminated glass (abbreviated as a laminated transparent base material δ2 hereafter) of comparative example 4 by a publicly-known method. At this time, when the yellow index b* of the laminated transparent base material δ1 and the laminated transparent base material δ2 were measured, difference Δb* between them was 2.72. A result thereof is shown in table 1.

Composition δ was stored at a room temperature for 12 months. Then, the stored composition δ 0.6 mass %, triethylene glycol-di-2-ethyl hexanonate 28.4 mass % and polyvinyl butyral resin 71 mass % as plasticizers, were weighed and mixed to obtain a resin composition, which was then loaded into the twin-screw extruder. Then, this resin composition was kneaded at 200° C. and extruded by T-die and the thickness was set to 0.7 mm by the calendar roll method, to thereby obtain the heat ray-shielding film (abbreviated as a shielding film δ' hereafter) for the heat ray-shielding laminated transparent base material of comparative example 4.

The obtained shielding film δ' was interposed between two inorganic glasses, to thereby obtain the heat ray-shielding laminated glass (abbreviated as a laminated transparent base material δ3 hereafter) of comparative example 4 by a publicly-known method. As shown in table 1, as an optical performance of the laminated transparent base material δ3, the solar transmittance was 62.3% when the visible light transmittance was 77.5%, and the haze value was 31.3%. A result thereof is shown in table 1.

TABLE 1

| | Heat ray-shielding particle-containing composition | | | | | | Optical performance of heat ray-shielding laminated transparent base material | | | | | | |
|---|---|---|---|---|---|---|---|---|---|---|---|---|---|
| | | | Type of dispersant, and addition amount to heat ray-shielding particles | | | | Addition amount of amino group | Fabrication of laminated transparent base material Immediately after fabricating | | | | Fabrication of laminated transparent base material After 12 months storage of the heat ray-shielding particle-containing composition | | |
| | Organic solvent | Heat ray-shielding particle Average dispersed particle size (nm) | Heat ray-shielding particle (Wt. pts..) | Amino group polymer dispersant (Wt. pts..) | Hydroxyl group polymer dispersant (Wt. pts..) | Carboxyl group polymer dispersant/ *other dispersant (Wt. pts..) | polymer dispersant, based on 100 wt. pts.. of heat ray-shielding particles (Wt. pts..) | Visible light transmittance (%) | Solar transmittance (%) | Haze (%) | Change of yellow index Δ b* | Visible light transmittance (%) | Solar transmittance (%) | Haze (%) |
| Example 1 | MIBK | 22 | 1 | 1 | 1 | — | 100 | 77.9 | 44.7 | 0.9 | 4.64 | 78.3 | 45.2 | 0.8 |
| Example 2 | MIBK | 22 | 1 | 1 | 0.5 | — | 100 | 78.2 | 44.9 | 1.0 | 5.01 | 77.8 | 44.5 | 1.0 |
| Example 3 | MIBK | 22 | 1 | 0.5 | 2 | — | 50 | 78.3 | 45.3 | 1.1 | 3.22 | 78.0 | 45.0 | 1.1 |
| Example 4 | MIBK | 22 | 1 | 1 | — | 1 | 100 | 78.0 | 45.2 | 1.0 | 4.50 | 77.9 | 44.7 | 1.0 |
| Example 5 | MIBK | 22 | 1 | 1 | — | 0.5 | 100 | 78.3 | 45.2 | 0.8 | 5.20 | 78.3 | 45.2 | 0.8 |
| Example 6 | MIBK | 22 | 1 | 0.5 | — | 2 | 50 | 77.9 | 44.8 | 0.9 | 3.79 | 78.1 | 44.9 | 0.9 |
| Example 7 | Toluene | 19 | 1 | 1 | 1 | — | 100 | 78.1 | 44.8 | 1.0 | 5.01 | 78.2 | 45.1 | 0.9 |
| Example 8 | MEK | 25 | 1 | 1 | 1 | — | 100 | 77.9 | 44.7 | 0.9 | 4.66 | 78.3 | 45.1 | 0.9 |
| Example 9 | Butyl acetate | 31 | 1 | 1 | 1 | — | 100 | 78.3 | 45.2 | 1.0 | 6.05 | 78.1 | 45.0 | 1.0 |
| Example 10 | IPA | 30 | 1 | 1 | 1 | — | 100 | 77.9 | 45.0 | 0.9 | 5.23 | 78.0 | 44.8 | 1.0 |
| Example 11 | Ethanol | 19 | 1 | 1 | 1 | — | 100 | 78.0 | 44.9 | 0.9 | 4.77 | 78.0 | 44.9 | 1.0 |
| Example 12 | MIBK | 22 | 1 | 1 | 1 | 1 | 100 | 78.0 | 45.0 | 1.0 | 3.99 | 77.9 | 44.9 | 1.0 |
| Comparative example 1 | MIBK | 22 | 1 | 1 | — | — | 100 | 78.0 | 44.7 | 0.9 | 25.1 | 78.1 | 44.9 | 0.9 |
| Comparative example 2 | MIBK | 21 | 1 | — | 3 | — | 0 | 77.7 | 46.2 | 3.0 | 5.97 | 78.0 | 46.7 | 2.9 |

TABLE 1-continued

| | | Heat ray-shielding particle-containing composition | | | | | Optical performance of heat ray-shielding laminated transparent base material | | | | | | |
|---|---|---|---|---|---|---|---|---|---|---|---|---|---|
| | | | Type of dispersant, and addition amount to heat ray-shielding particles | | | | Addition amount of amino group polymer dispersant, based on 100 wt. pts.. of heat ray-shielding particles (Wt. pts..) | Fabrication of laminated transparent base material Immediately after fabricating heat ray-shielding particle-containing composition | | | | Fabrication of laminated transparent base material After 12 months storage of the heat ray-shielding particle-containing composition | | |
| | Organic solvent | Heat ray-shielding particle Average dispersed particle size (nm) | Heat ray-shielding particle (Wt. pts..) | Amino group polymer dispersant (Wt. pts..) | Hydroxyl group polymer dispersant (Wt. pts..) | Carboxyl group polymer dispersant/ *other dispersant (Wt. pts..) | | Visible light transmittance (%) | Solar transmittance (%) | Haze (%) | Change of yellow index Δ b* | Visible light transmittance (%) | Solar transmittance (%) | Haze (%) |
| Comparative example 3 | MIBK | 27 | 1 | 0.3 | 2.2 | — | 30 | 77.0 | 46.4 | 3.7 | 5.48 | 76.9 | 46.3 | 3.9 |
| Comparative example 4 | MIBK | 22 | 1 | 1 | — | *1 | 100 | 79.6 | 47.3 | 0.9 | 2.72 | 77.5 | 62.3 | 31.3 |

Wherein, *1 is (wt. pts..) of a polymer dispersant having an epoxy group as a functional group Evaluation of Examples 1 to 12 and Comparative Examples 1 to 4

In examples 1 to 12, since the amino group polymer dispersant having a high dispersion ability to the heat ray-shielding particles, were sufficiently contained, agglomeration of the heat ray-shielding particles could be prevented, and laminated transparent base materials A to K having a low haze value could be obtained. Further, since at least one of the hydroxyl group polymer dispersant or the carboxyl group polymer dispersant having a high heat resistance was sufficiently contained, the laminated transparent base material having a heat resistance in which a degradation or yellowish change was suppressed, could be obtained.

On the other hand, in comparative example 1, neither the hydroxyl group polymer dispersant nor the carboxyl group polymer dispersant having a high heat resistance, was contained, yellowish change occurred in the heat resistance test, and an outer appearance of the obtained laminated transparent base material was damaged.

In comparative examples 2 to 3, since the amino group polymer dispersant having a high dispersion ability to the heat ray-shielding particles, was not contained, or the content was not sufficient, agglomeration of the composite tungsten oxide particles occurred, and the haze value of the obtained laminated transparent base material exceeds 2% and transparency was damaged.

In comparative example 4, since the dispersant having the epoxy group with a high heat resistance was contained similarly to the hydroxyl group polymer dispersant and the carboxyl group polymer dispersant, the laminated transparent base material having a high heat resistance, with yellowish change suppressed in the heat resistance test, could be obtained. However, since the epoxy group has a reactivity with the amino group, thus reducing the dispersion ability of the amino group polymer dispersant, to the heat ray-shielding particles, agglomeration of the composite tungsten oxide particles occurred if the laminated transparent base material was fabricated after long term storage from fabrication of the heat ray-shielding particle-containing composition, and the haze value of the obtained laminated transparent base material exceeded 2% and transparency was damaged.

The invention claimed is:

1. A heat ray-shielding particle-containing composition, containing a composite tungsten oxide particle expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$), and having a hexagonal crystal structure, and two kinds or more dispersants, comprising:
   at least one kind of an amino group polymer dispersant as the dispersant, having an amino group as a functional group, and having a thermal decomposition temperature of 200° C. or more; and
   at least one kind of the group consisting of a hydroxyl polymer dispersant having a hydroxyl group (—OH group) as a functional group and a carboxyl group polymer dispersant having a carboxyl group (—COOH) as a functional group as the dispersant, having an acrylic backbone and a thermal decomposition temperature of 200° C. or more, wherein
   a content of an organic solvent having a boiling point of 120° C. or less is 5 mass % or less,
   50 wt. part or more and 9900 wt. part or less of the amino group polymer dispersant is contained, based on 100 wt. part of the composite tungsten oxide particles,
   5 wt. part or more and 1000 wt. part or less of the hydroxyl polymer dispersant and the carboxyl group polymer dispersant is contained, based on 100 wt. part of the composite tungsten oxide particles, and
   a dispersant having an epoxy group as a functional group is not contained in the heat ray-shielding particle-containing composition.

2. The heat ray-shielding particle-containing composition according to claim 1, wherein an amine value of the amino group polymer dispersant is 5 to 100 mgKOH/g.

3. The heat ray-shielding particle-containing composition according to claim 1, wherein the organic solvent is one kind or more selected from the group consisting of toluene, methyl ethyl ketone, methyl isobutyl ketone, butyl acetate, isopropyl alcohol, and ethanol.

4. A heat ray-shielding film, wherein the heat ray-shielding particle-containing composition of claim 1, polyvinyl acetal resin, and a plasticizer are kneaded, which is then molded into a film shape.

5. A heat ray-shielding laminated transparent base material, wherein the heat ray-shielding film of claim 4 exists between two or more transparent base materials.

6. A method of producing a heat ray-shielding particle-containing composition of claim 1 comprising:
  a first step of obtaining a dispersion liquid by dispersing composite tungsten oxide particles expressed by a general formula $M_yWO_z$ (wherein M is one or more kinds of element selected from Cs, Rb, K, Tl, In, Ba, Li, Ca, Sr, Fe, Sn, Al, and Cu, satisfying $0.1 \leq y \leq 0.5$, $2.2 \leq z \leq 3.0$) and having a hexagonal crystal structure, and the dispersant in an organic solvent having a boiling point of 120° C. or less;
  a second step of obtaining a mixture by adding and mixing the dispersant or the dispersant dissolved in the organic solvent, into a dispersion liquid obtained by the first step; and
  a third step of obtaining a heat ray-shielding particle-containing composition by drying until a content of the organic solvent contained in the mixture obtained by the second step, becomes 5 mass % or less.

7. The method of producing the heat ray-shielding particle-containing composition according to claim 6, wherein a composite tungsten oxide particle having an average particle size of 40 nm or less, is used as the composite tungsten oxide particle in the dispersion liquid.

* * * * *